United States Patent Office 2,899,473
Patented Aug. 11, 1959

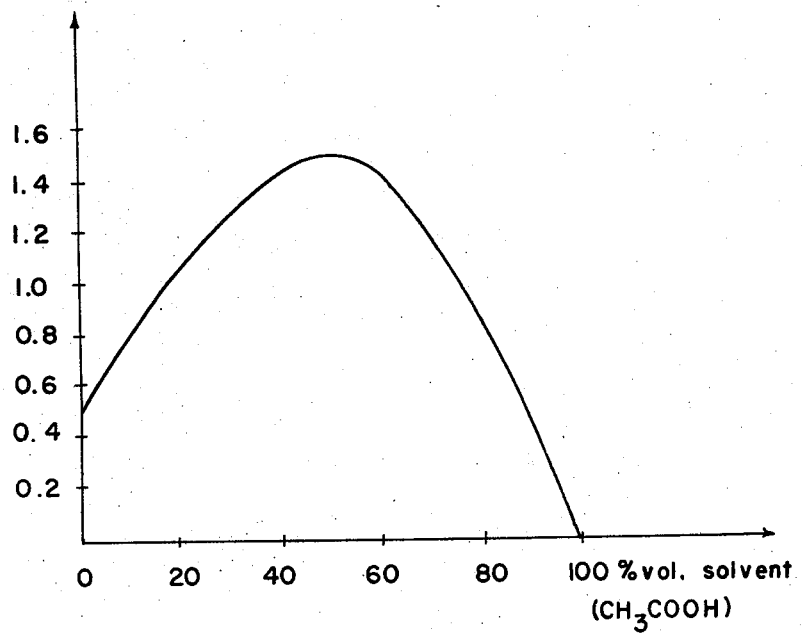

2,899,473

PROCESS FOR THE MANUFACTURE OF OLEFINIC COMPOUNDS BY THE DEHYDROCHLORINATION OF CORRESPONDING CHLORINATED DERIVATIVES

Pierre Leprince, Louvain, Belgium, and Fernand Coussemant and Jean Limido, Paris, France, assignors to Institut Français du Petrole des Carburants et Lubrifiants, Rueil-Malmaison, Seine-et-Oise, France Application July 28, 1955, Serial No. 525,042

Claims priority, application France July 29, 1954

8 Claims. (Cl. 260—666)

The present invention relates to a catalytic process for the manufacture of olefinic compounds starting from the corresponding chlorinated derivatives, which process makes it possible to realize good yields from the standpoint of time and of weight.

The most recently employed processes for the production of olefines or of compounds containing an olefinic double bond, by the dehydrochlorination of chlorinated derivatives, operate in the vapor phase and at relatively high temperature in the absence or presence of catalysts such as metallic oxides ($Al_2O_3$, $TiO_2$, $ThO_2$, etc.), metallic salts ($CaSO_4$, $BaCl_2$, etc.), and the like.

The temperatures employed vary between 300 and 500° C. The pressure is generally low and not much different from atmospheric pressure.

These prior processes present, in various degrees, the following disadvantages which result from the employment of relatively high temepratures and from the fact that the reaction takes place in the vapor phase:

(a) Substantial expenditure of heat energy at a high thermal level;

(b) Incomplete reaction necessitating a recycling of the unreacted chloride;

(c) Existence of parasite reactions which diminish the total yield: formation of degradation products yielding, more espectially, lighter products and heavier products; and (d) Complex character of the apparatus, particularly for supplying the necessary thermal energy and for regulating the temperature.

Dehydrochlorination in the liquid phase in the presence of a suitable catalyst eliminates most of these defects. It then becomes necessary, as thermodynamic study shows, to displace the equilibrium, which under the conditions of temperature and pressure employed is in favor of the chlorinated derivative, in favor of the production of olefine. This is realized by the systematic elimination of the liberated hydrochloric acid.

In view of the foregoing, the present invention relates to dehydrochlorination carried out in the liquid phase with elimination of the hydrochloric acid as it is formed. But, even under these conditions, the reaction is still rather slow and the yields are limited by the formation of olefinic condensation products which may eventually deactivate the catalyst. The tendency of the olefine to polymerize can be reduced by distilling the olefinic compound from the reaction mixture as such olefinic compound is formed. This elimination of the olefine, as well as that of the hydrochloric acid, can be accelerated and rendered complete by entrainment thereof by means of a gas, such as $N_2$ or $CO_2$, which is inert or does not participate in the reaction.

However, the elimination of the olefinic compounds from the reaction medium does not entirely prevent the formation of condensation products. These are manifested in the form of reduced olefine yield and also in reduced yield from the reaction, per unit of time, due to the progressive deactivation of the catalyst.

One object of the present invention is the embodiment of a process whereby all undesired condensation is essentially prevented, and thus to improve the speed of the reaction and to increase the yield of olefine. This object is realized according to the present invention by the employment of a solvent which, while acting as a diluent for the reaction medium, eliminates any secondary polymerization reaction, even when the catalyst employed as dehyrogenation catalyst is one, such for example as a Friedel-Crafts catalyst, which has a polymerizing action.

Another object of the invention is to embody a process of the character described whereby the reaction speed can be enhanced in such a way as to make possible the employment of high temperatures. This object is realized according to the present invention by means of suitable high boiling-point solvents.

The invention is further based on the appreciation of the fact that the dehydrochlorination reaction has a marked ionoid character and that its course is favored when it is carried out in a polar solvent.

The different solvents employed according to the present invention and which make possible the realization of one or more of the aforesaid objects are thus either stable polar solvents such as organic acids (acetic acid, propionic acid, butyric acid, benzoic acid, etc.), aromatic nitro compounds, alkylated phenols, aromatic chlorine compounds, etc., or solvents having high boiling points (such e.g. as decahydronaphthalene, polychlorinated derivatives, etc.) which make possible the realization of correspondingly high reaction temperatures.

Certain solvents are particularly advantageous for use in certain cases; these are those solvents which possess both polar properties and high temperature boiling point, especially nitrobenzene, ortho-dichlorobenzene, chloronitrobenzene, dichloroacetic acid and trichloroacetic acid.

The utilization of the solvents according to the present invention conjointly with the catalysts currently employed for the manufacture of olefines from chlorinated derivatives (metal halides such as ferric chloride aluminum chloride, antimony chloride, manganese chloride, zinc chloride, etc.), results in a very significant improvement in the yield and in the speed of the reaction.

Thus, under identical conditions of temperature and pressure (atmospheric pressure) and with the same concentration of catalyst, it has been possible by using a solvent according to the present invention (for example, acetic acid) to realize an increase in yield from 85% to 98.5% and simultaneously to triple the initial reaction speed, establishing optimum conditions of concentration of solvent. The curve shown on the accompanying sheet of drawing sets forth the relation existing between initial reaction speed and the concentration of solvent.

It is seen from the said curve that the initial reaction speed expressed in thousandths of a mol per minute and per gram of catalyst is a maximum for a concentration of solvent of about 50%. By supplying the reactants in continuous manner, the concentration of solvent can be maintained and while taking into account the elimination of olefine, and in this way it is possible to arrive at conditions where the reaction speed remains constantly at a maximum.

Experience with zinc chloride as catalyst has demonstrated that the employment of a solvent according to the present invention (in this particular case, benzoic acid)

makes it possible to raise the yield from 78% to 85% and at the same time to increase the reaction speed by more than 100%. Similar results have been obtained with decahydronaphthalene as solvent.

However, the present invention is not limited to the employment of solvents suitable for increasing the yield and speed of the reaction, but extends also to the realization of improved results by means of the use of novel catalysts. These catalysts of the present invention, which make possible the realization of maximum yields, are catalysts constituted by strong acids (mineral and organic). Preferred among the former (mineral acid type) are sulfuric acid and phosphoric acid. Preferred among the latter (organic acid type) are the chloroacetic acids, the fluoroacetic acids, benzenesulfonic acid, toluenesulfonic acid, naphthalenesulfonic acid, etc.

These catalysts of high activity also have the advantage of being easily miscible with the reaction medium, which is very important, particularly when a solvent is being employed.

The catalysts according to the present invention make it possible, even in the absence of solvent, to obtain yields higher than those obtained with the heretofore-employed catalysts. Thus, while tin chloride and zinc chloride enable the realization of yields of only 85% and 78% respectively, phosphoric acid makes possible a yield of 90%, dichloroacetic acid a yield of 92.5%, and trichloroacetic acid a yield of 98.5%.

The following table exemplifies results obtainable when employing solvents and catalysts of the present invention for the dehydrochlorination of, for example, monochlorocyclohexane:

up in 5-normal caustic soda solution. The cyclhexene, which entrains small quantities of acetic acid and of hydrochloric acid, is washed with an alkaline solution and then with water. After washing, the obtained product is of high purity (index of refratcion $N_D^{20}=1.4462$). The conversion amounts to 50% in 1 hour (20 parts of cyclohexene product), and to 75% in 116 minutes (30 parts of cyclohexene product). The yield relative to the initial monochlorocyclohexane is 98.5% of the theoretical.

The operation can also be carried out in continuous manner and while maintaining the reaction speed as closely as possible to its maximum value (which corresponds substantially to a percentage of solvent of about 50% by weight). Using the same initial proportions of reactants as those in the preceding paragraph, the reaction mixture is quickly brought to boiling temperature (116–117°) under atmospheric pressure. Monochlorocyclohexane is then continuously introduced at the rate of 41.5 parts per hour in a manner to maintain the volume of the reaction mixture constant, the cyclohexene and hydrochloric acid being eliminated by distillation as they are formed. There are thus produced 28.5 parts of cyclohexene per hour, which represents a yield of 99% relative to the theoretical.

Example 2

This exemplifies the use of decahydronaphthalene as solvent and antimony trichloride as catalyst.

88 parts (0.635 mol) of decahydronaphthalene, 102 parts (0.86 mol) of monochlorocyclohexane, and 40 parts (0.175 mol) of antimony trichloride are admixed

| Temperature in ° centigrade | Catalyst | Concentration of catalyst in grams per liter | Solvent | Percent vol. of solvent | Initial speed in 1/1000 mol/ minute per gram of catalyst as conc'n used | Yield expressed in percent of theoretical yield (discontinuous) |
| --- | --- | --- | --- | --- | --- | --- |
| 116.5 | SnCl$_4$ | 40 | CH$_3$COOH | 44.7 | 1.43 | 98.5 |
| 116 | SnCl$_4$ | 40 | CH$_3$COOH | 61.6 | 1.45 | 98.5 |
| 116.5 | SnCl$_4$ | 40 | CH$_3$COOH | 75.6 | 1.01 | 98.5 |
| 116 | SnCl$_4$ | 40 | CH$_3$COOH | 76.6 | 1.00 | 98.5 |
| 116 | SnCl$_4$ | 40 | CH$_3$COOH | 84.0 | 0.71 | 98.5 |
| 117 | SnCl$_4$ | 40 | | 0 | 0.47 | 85 |
| 147 | Cl$_2$CHCOOH | 500 | | 0 | 0.02 | 98.5 |
| 143 | Cl$_3$CCOOH | 100 | | 0 | 0.18 | 92.5 |
| 142 | ZnCl$_2$ | 34.7 | | 0 | 0.66 | 78 |
| 150 | ZnCl$_2$ | 39.3 | C$_6$H$_5$COOH | 23.6 | 1.43 | 85 |
| 160 | ZnCl$_2$ | 34.6 | decahydronaphthalene | 27.0 | 1.51 | 84 |

In carying out the process of the invention industrially, it is desirable to operate in a conutinuous manner, in order to maintain a high rate of production, thus making it possible to reduce investment to a minimum and to realize uniform operating conditions with great ease of control. The requisite apparatus is simple, consisting essentially of a reactor which is resistant to the corrosive active of hydrochloric acid and of a rectification column, at the head of which the olefinic product and the hydrochloric acid are separated. Means for regulably feeding reactants, for measuring the temperature, and for heating—for example electrically—are also provided.

The following examples set forth presently-preferred representative embodiments of the invention. In these examples, the parts are by weight, and the temperatures are in degrees centigrade.

Example 1

This exemplifies the use of acetic acid as solvent and tin chloride as catalyst.

A mixture of 57 parts (0.485 mol) of monochlorocyclohexane, 45 parts (0.75 mol) of acetic acid, and 4.1 parts (0.0158 mol) of SnCl$_4$ is heated and brought to boiling (116°) under atmospheric pressure. The reaction proceds rapidly; the produced cyclohexene and HCl are eliminated from the reaction medium as fast as they are produced. The liberated hydrochloric acid is taken at ordinary temperature (20–30°). The mixture is then progressively heated up to boiling temperature (162°) at atmospheric pressure, whereupon reaction takes place. The product of the reaction—cyclohexene—is very pure ($N_D^{20}=1.4461$). The hydrochloric acid is taken up with 5-normal caustic soda solution. The reaction is continued until evolution of the acid ceases. The yield attained is 98.5% of the theoretical.

It may be noted that, due to the constant removal of the product, the temperature of the reaction mixture increases regularly. It is necessary to limit this temperature increase to 180° in order to avoid some cracking (tars). This temperature limiting can be easily realized by operating in continuous manner. After bringing the reaction mixture to boiling, monochlorocyclohexane is added at the rate of 23 parts per hour in a manner to maintain the volume of the reaction mixture constant, the cyclohexene and HCl being removed by distillation as they are formed. There is thus realized a production of 16 parts per hour of cyclohexene, corresponding to 99% of the theoretical yield.

Example 3

This exemplifies the use of nitrobenzene as solvent and antimony trichloride as catalyst.

84 parts of nitrobenzene, 70 parts of monochlorocyclohexane, and 15.9 parts of antimony trichloride are admixed. The mixture is heated to boiling while bubbling nitrogen therethrough in order to facilitate the removal of the resultant cyclohexene and the entrainment of the liberated hydrochloric acid. Under these conditions, the reaction mixture boils at 151°. In order to keep the volume of the reaction mixture constant, monochlorocyclohexane is preferably added progressively at the rate of 30 parts per hour; the resultant cyclohexene is produced at the rate of 20 parts per hour, which corresponds to a yield of 95%.

*Example 4*

This exemplifies the use of dichloroacetic acid as catalyst for the dehydrochlorination of monochlorocyclohexane.

A mixture of 100 parts (0.78 mol) of $Cl_2CHCOOH$ and 102 parts (0.86 mol) of monochlorocyclohexane is heated to boiling. The boiling temperature, initially at 140°, rises progressively as the monochlorocyclohexane is consumed, reaching 193°. The resultant cyclohexene and HCl are removed by distillation as they are formed, the hydrochloric acid being taken up in 5-normal caustic soda solution. The yield of cyclohexene thus obtained is more than 95% of the theoretical.

In some cases, it may be desirable to operate in a continuous manner in order to maintain the reaction temperature at a level which avoids any decomposition due to excessive temperatures. To obtain a suitable boiling temperature which satisfies these conditions, there are initially added, for a like quantity of monochlorocyclohexane, 230 parts of $Cl_2CHCOOH$. After the mixture is rapidly brought to boiling (165°), monochlorocyclohexane is added at the rate of 33 parts per hour in order to maintain the volume of the reaction mixture constant, resultant cyclohexene and hydrochloric acid being removed by distillation as fast as they are formed. In this way, there are produced 22.5 parts of cyclohexene per hour, which corresponds to 99% of the theoretical yield.

*Example 5*

This exemplifies the use of dichloroacetic acid as catalyst for the dehydrochlorination of chloro-2-hexane.

A mixture of 100 parts (0.780 mol) of dichloroacetic acid and 52 parts (0.43 mol) of chloro-2-hexane, effected at ordinary temperature (about 20–30°), is rapidly heated to boiling (148°) under atmospheric pressure. The evolved hydrochloric acid is titrated with 5-normal caustic soda solution in order to measure the speed of the reaction. During the first hour, 0.130 mol of HCl is liberated, which corresponds to a conversion rate of 30%.

The reaction product, removed as fast as it is formed, neutralized, dried, and then fractionated, yields two fractions: (1) 24 parts (0.284 mol) of a first fraction, boiling point=66–67°, $N_D^{20}$=1.3945, and (2) 15 parts (0.116 mol) of a second fraction, boiling point=123°, $N_D^{20}$=1.4143.

Infra-red spectrum analysis of the first fraction shows that it contains 100% olefines, of which 98–99% are hexene-2. As for the second fraction, this is constituted by unconverted chloro-2-hexane, which can be recycled.

The yield of hexene-2 relative to the chloro-2-hexane is greater than 90% of the theoretical.

*Example 6*

This exemplifies the use of trichloracetic acid as a catalyst.

A mixture of 102 parts (0.87 mol) of monochlorocyclohexane and 11 parts (0.0675 mol) of trichloroacetic acid is progressively heated to boiling (143°). At 30°, the dissolution of the trichloracetic acid is complete. The boiling temperature rises as the monochlorocyclohexane is consumed, finally reaching about 195°. The cyclohexene and HCl, which are formed, are removed by distillation as fast as they are produced, the HCl being taken up in 5-normal caustic soda solution. The obtained cyclohexene, after being washed, is of great purity, as is shown by its index of refraction: $N_D^{20}$=1.4462. 25%, i.e. about 25 parts, of the monochlorocyclohexane are converted in the course of 2 hours into 16 parts of cyclohexene. The final yield of cyclohexene amounts to 92.5% of the theoretical.

In some cases, it is desirable to carry out the reaction in continuous manner at a reaction temperature which assures avoidance of decomposition of reaction products and of the catalyst on the one hand, and which increases the reaction rate on the other hand. This is realized as follows: After heating the reaction mixture—according to the preceding paragraph—to boiling (143°), monochlorocyclohexane is added at the rate of 14 parts per hour in order to maintain the volume of the reaction mixture constant, the resultant cyclohexene and hydrochloric acid being removed by distillation as fast as they are formed. There are thus produced 9.5 parts of cyclohexene per hour, which represents 99% of the theoretical yield.

*Example 7*

This exemplifies the use of phosphoric acid as catalyst.

150 parts of phosphoric acid 65° Be (85%), in the form of commercial phosphoric acid, are added to about 50 parts of monochlorocyclohexane, and the mixture is then heated to 180–190° until the water is practically eliminated. After cooling to 155–160°, monochlorocyclohexane is added at the rate of 61 parts per hour. The resultant olefine, cyclohexene, and hydrochloric acid are distilled off as fast as they are formed. The cyclohexene is then neutralized by washing. The production amounts to 37 parts of cyclohexene per hour, which represents a yield in excess of 90% of the theoretical.

In any of the foregoing examples the particularly employed solvent may just as well be replaced by another solvent chosen from the group consisting of polar solvents and of solvents having a high boiling point such as monochloracetic acid, monofluoracetic acid, propionic acid, benzoic acid, nitromethane, nitroethane, 1,2-dichlorethane, 1,2-dichlorobutane, 2,3-dichlorobutane, 1,2-dichlorocyclohexane, 1,2-dichlorohexane, benzonitrile, monochlorobenzene, orthodichlorobenzene, chloronitrobenzene, nitrotoluene, benzylchloride, phenylchloroform, dichloracetic acid, trichloracetic acid, phenols, cresols (o-, m- and p-), cetane. . . .

In each of the foregoing examples relative to the dehydrochlorination without using a solvent and by means of a catalyst according to the invention, the latter may as well be replaced by equivalent quantities of other of the hereinbefore described catalysts such as for example di and trifluoracetic acids, di and trichloracetic acids, benzene sulfonic acid, ortho and para toluene sulfonic acids, 2 naphthalene sulfonic acid, sulfuric acid, phosphoric acid. . . .

The procedure set forth in the foregoing examples may be applied with like success to other chlorinated derivatives such as monochlorobutane, chlorocyclopentane, methylchlorocyclopentane, methylchlorocyclohexane, monochlorodecahydronaphthalene, chloro 2 pentane, chloro 2 heptane, α chloroethylbenzene, chloropropylbenzene, whereby there are obtained the corresponding olefinic compounds i.e. respectively butene, cyclopentene, methylcyclopentene, methylcyclohexene, octahydronaphthalene, pentene 2, heptene 2, styrene and phenylpropene.

When using a solvent as hereabove described there may be employed either a catalyst according to the invention or a per se conventional catalyst, i.e., known dehydrochlorinating catalyst. However, in every case the combination catalyst-solvent has a specific chemical effect since it secures higher yields and simultaneously allows to increase very significantly the reaction speed.

Having thus disclosed the invention what is claimed is:

1. A method of producing cyclohexene by the dehydrochlorination of monochlorocyclohexane, which comprises heating the latter to a temperature not in excess of about 195° C. under a pressure not in excess of about atmospheric pressure in admixture with stannic chloride as dehydrochlorinating catalyst and of acetic acid as solvent, the heating being carried out in the liquid phase.

2. A method of producing cyclohexene by way of dehydrochlorination of monochlorocyclohexane which comprises heating the latter to a temperature not in excess of about 195° C. under a pressure not in excess of about atmospheric pressure in admixture with antimony trichloride, acting as a catalyst and of decahydronaphthalene, used as a solvent, the heating being carried out in the liquid phase.

3. A method of producing cyclohexene by way of dehydrochlorination of monochlorocyclohexane which comprises heating the latter to a temperature not in excess of about 195° C. under a pressure not in excess of about atmospheric pressure in admixture with antimony trichloride acting as a catalyst and of nitrobenzene, used as a solvent, the heating being carried out in the liquid phase.

4. A method of producing cyclohexene by the dehydrochlorination of monochlorocyclohexane, which comprises heating the latter to a temperature not in excess of about 195° C. under a pressure not in excess of about atmospheric pressure in dichloroacetic acid in the liquid phase, as dehydrochlorinating catalyst.

5. A method of producing hexane-2 by the dehydrochlorination of chloro-2-hexane, which comprises heating the latter to a temperature not in excess of about 195° C. under a pressure not in excess of about atmospheric pressure in dichloroacetic acid in the liquid phase, as dehydrochlorinating catalyst.

6. A method of producing cyclohexene by the dehydrochlorination of monochlorocyclohexane, which comprises heating the latter to a temperature not in excess of about 195° C. under a pressure not in excess of about atmospheric pressure in trichloroacetic acid in the liquid phase, as dehydrochlorinating catalyst.

7. A method of producing cyclohexene by the dehydrochlorination of monochlorocyclohexane, which comprises heating the latter to a temperature not in excess of about 195° C. under a pressure not in excess of about atmospheric pressure in phosphoric acid in the liquid phase, as dehydrochlorinating catalyst.

8. A method of producing an olefinic hydrocarbon containing 4 to 8 carbon atoms by way of dehydrochlorination of the corresponding chlorinated hydrocarbon, which comprises heating the latter to a temperature not in excess of about 195° C. under a pressure not in excess of about atmospheric pressure in the liquid phase in a catalyst system selected from the group consisting of (a) stannic chloride as dehydrochlorinating catalyst and acetic acid as solvent, (b) antimony chloride as dehydrochlorinating catalyst and decahydronaphthalene as solvent, (c) antimony chloride as dehydrochlorinating catalyst and nitrobenzene as solvent, (d) dichloroacetic acid as dehydrochlorinating catalyst, (e) trichloroacetic acid as dehydrochlorinating catalyst, and (f) liquid phosphoric acid as dehydrochlorinating catalyst.

References Cited in the file of this patent

UNITED STATES PATENTS

| | | |
|---|---|---|
| 2,065,323 | Thomas et al. | Dec. 22, 1936 |
| 2,183,574 | Levine et al. | Dec. 19, 1939 |
| 2,186,370 | Dosser | Jan. 9, 1940 |
| 2,288,580 | Baehr et al. | June 30, 1942 |
| 2,368,446 | Buc | Jan. 30, 1945 |
| 2,419,198 | Bowman | Apr. 22, 1947 |
| 2,436,491 | Schmerling | Feb. 24, 1948 |
| 2,590,208 | Rickert et al. | Mar. 25, 1952 |

FOREIGN PATENTS

| | | |
|---|---|---|
| 694,488 | Great Britain | July 22, 1953 |